L. H. DYER.
INTERNAL COMBUSTION ENGINE.
APPLICATION FILED SEPT. 18, 1915.
1,339,176. Patented May 4, 1920.
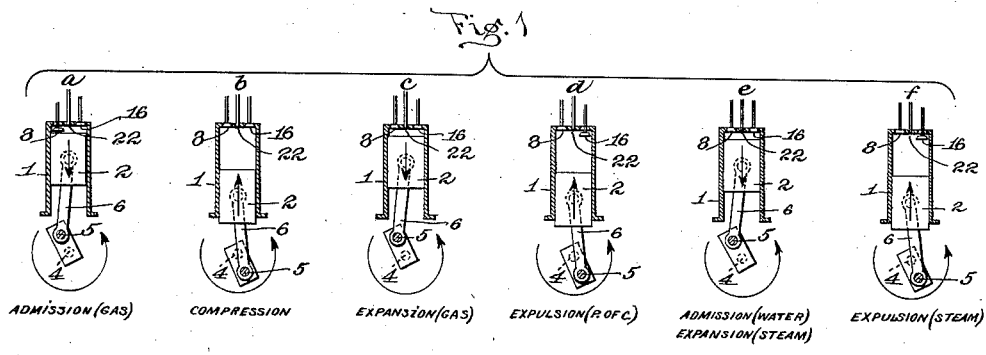
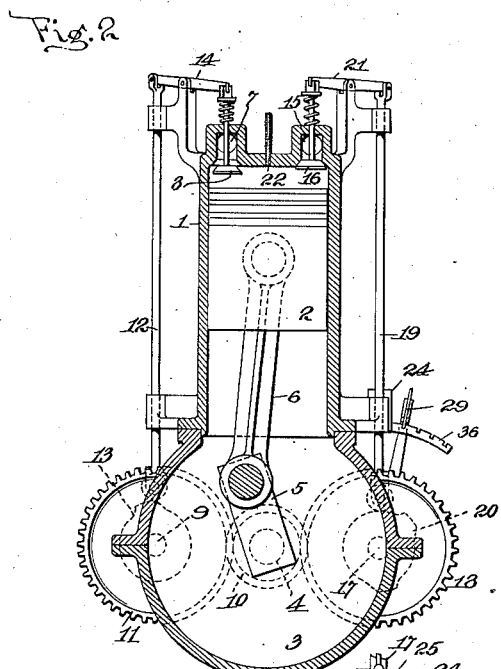
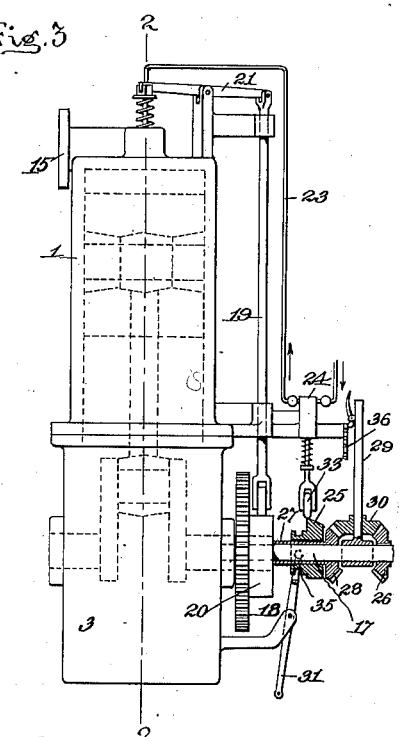
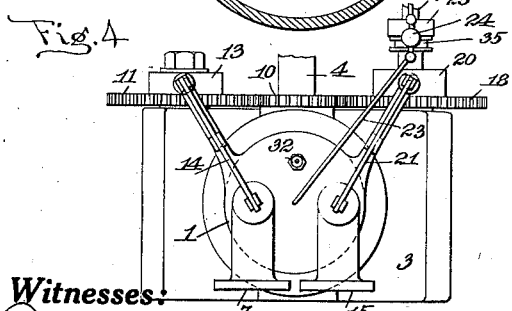
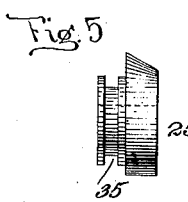
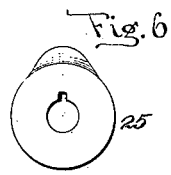
Witnesses: Inventor
Leonard H. Dyer
By Dyer & Taylor
Attorneys.

UNITED STATES PATENT OFFICE.

LEONARD H. DYER, OF GREENWICH, CONNECTICUT.

INTERNAL-COMBUSTION ENGINE.

1,339,176.            Specification of Letters Patent.       Patented May 4, 1920.

Application filed September 18, 1915. Serial No. 51,319.

*To all whom it may concern:*

Be it known that I, LEONARD H. DYER, a citizen of the United States, and resident of Greenwich, county of Fairfield, State of Connecticut, have invented a certain new and useful Internal-Combustion Engine, of which the following is a specification.

The object I have in view is—

First: to improve the efficiency of such engine by recovering heat generated by the expansion of the gases and converting such heat into work.

Second: to improve the scavenging of the engine.

Third: to simplify the cooling.

These and further objects will more fully appear from the following specification and accompanying drawings, considered together or separately.

In the drawings,

Figure 1 is a diagrammatic view showing reiterated certain of the working parts of an engine embodying my invention, illustrating different stages of the operating cycle;

Fig. 2 is a sectional view of an engine embodying my invention, the section being taken on the line 2, 2 of Fig. 3;

Fig. 3 is a side view of the engine shown in Fig. 2, certain details of construction being shown in section;

Fig. 4 is a plan view of the same engine;

Fig. 5 is a side view; and

Fig. 6 is an end view of a pump operating cam used in connection with the engine illustrated in the preceding figures.

In all views like parts are designated by the same reference characters.

Referring particularly to Fig. 1, there is illustrated a single cylinder engine embodying my invention operating upon the six-stroke cycle principle.

In the position $a$ the piston is about to descend; the inlet valve 8 is open and the outlet valve 16 closed; an explosive mixture is drawn into the combustion chamber by the descent of the piston.

In the position $b$, illustrating the second stroke, the piston is rising, compressing the charge.

In the position $c$ illustrating the third stroke, the piston is descending and the charge is expanding, having been ignited at the proper moment as by the igniter 32.

In the positions $b$ and $c$ both valves are closed.

In the position $d$, illustrating the fourth stroke, the piston is rising, expelling the products of combustion through the exhaust valve 16.

So far, during these four strokes, the engine is operating on the well-known four-cycle principle.

In the position $e$, which represents the fifth stroke of the cycle, water is admitted through the inlet 22. This water is admitted in sufficient quantity to absorb the heat caused by the combustion of the gases during the third stroke. The water absorbs the heat and is converted into steam. During this stroke ($e$) the piston descends, propelled by the expansion of the steam. The steam expanding will convert a portion of its heat into work.

In the stroke $f$, illustrating the sixth stroke and the upward movement of the piston, the steam is expelled through the opening of the exhaust valve a second time.

The same cycle is repeated. It will be seen, therefore, that the combustion chamber is cooled by injecting water inside of it after the gases have been expanded and partly expelled. It will also be seen that there is an additional expulsion stroke which improves the scavenging properties of the engine, as there are two expulsion strokes after the gas expansion stroke. It will also be seen that while the engine illustrated operates upon the six-stroke cycle principle, there are two expansion strokes in each cycle, namely the third and the fifth, the expansion during the third stroke being the expansion of the gas, while the expansion during the fifth stroke is the expansion of the steam.

Referring to Figs. 2 to 6 inclusive, showing in greater detail the construction of an engine embodying my invention, the cylinder 1 has no water jacket. The piston 2, crank case 3, shaft 4, crank 5 and connecting rod 6 are of the usual type. The inlet port 7 is controlled by an inlet valve 8. This valve is operated by the following mechanism:

A lay shaft 9 is driven from the shaft 4 by means of a gear 10 on the latter and a gear 11 on the shaft 9. The gear 11 has three times the number of teeth as the gear 10, hence the shaft 9 will turn once to every three revolutions of the shaft 4. Associated with the gear 11 and shaft 9 is a cam 13, which will make one revolution to every three revolutions of the crank shaft. Associated with this cam is a rod 12 which is connected to the valve 7 by a rocker arm 14. It is therefore apparent that by properly proportioning the cam and arranging its location in relation to the shaft 9 that the valve 8 may be opened at the proper time and will remain open the proper duration to admit the explosive mixture into the cylinder during the first stroke of the cycle.

The outlet port 15 is provided with a suitable valve 16. This valve is actuated through the agency of a lay shaft 17 carrying a gear 18. This gear 18 bears the same relation to the gear 10 as the gear 11 does to the gear 10, so that the cam 20, associated with the shaft 17 and gear 18, will make one revolution to every three revolutions of the crank shaft. With this cam is associated a rod 19 and a rocker arm 21 so that the outlet valve will be opened at the proper time and will remain open through the proper period. The cam 20 is provided with two raised portions, as shown in Fig. 2, so that the valve will be opened during the fourth and sixth strokes of the cycle. The cams should be properly proportioned so that the valves will be opened at the proper time and will remain open during the desired period.

The water inlet 22 is connected through a water pipe 23 to a source of water supply. This water is introduced through the inlet 22 by means of a pump 24. This pump is actuated by a cam 25 which in the embodiment chosen for illustration is associated with the lay shaft 17 previously referred to. The pump rod engages with this cam, for example through the mediary of a friction wheel 33. The cam 25 has a high part on it as shown in Figs. 5 and 6 and making one revolution to every three revolutions of the crank shaft it will raise the pump rod and inject a quantity of water through the inlet 22 at the proper time, for example at the beginning of the fifth stroke of the cycle. It is to be understood that the capacity of the pump and its actuating means will be so chosen that the water will be introduced at the proper time and in the proper amount to secure the best efficiency. It is desirable that the introduction of water be controlled as to period and amount. To permit this to be done the mechanism illustrated may be employed.

Referring to Fig. 3, it will be seen that the shaft 17 carries a bevel gear 26. Mounted on this shaft is a sleeve 27. This sleeve carries a bevel gear 28. A lever 29 carries a bevel gear 30. Said bevel gear engages with the gears 26 and 28. The cam 25 is mounted upon the sleeve 27 and turns with the latter. The gears 26, 28 and 30 having each the same number of teeth and the lever 29 being held in immovable position by suitable means, for example by a toothed rack 36, see Fig. 2, it is apparent that the sleeve 27 will rotate at the same speed as the shaft 17, but in the opposite direction thereto. If the lever 29 be moved, it is apparent that there will be a relative rotative movement between the shaft 17 and sleeve 27. This will have the effect of advancing or retarding the period during which the high part of the cam 25 will engage with the pump rod. This produces a means for varying the period of the injection of water.

To provide a means for controlling the quantity of water injected, the cam 25 is made to slide upon the sleeve 27 and rotates therewith by any suitable means, such as a feather engaging the key way of the cam illustrated in Fig. 6. The cam is slid upon the sleeve by a lever 31 engaging a groove 35 in the cam. The high part of the cam tapers, as shown in Fig. 5, hence by changing the position of the cam upon the sleeve different portions of the cam may be caused to engage with the pump rod and move the latter a distance depending upon the height of that part of the cam in engagement with the rod.

32 is an igniter of any suitable kind for igniting the products of combustion after the same have been compressed.

The operation of the engine thus described is in accordance with the principles set out in the first part of this specification under the description of the illustration shown in Fig. 1. The water injected into the cylinder should be sufficient in quantity to prevent undue heating of the parts but should not be so great in quantity as to prevent the proper ignition or expansion of the gases after admission.

The invention may be modified in many ways. I have illustrated it as applied to a single cylinder engine operating upon the six-stroke cycle principle analogous to a four cycle engine, but it is to be understood that such is chosen solely for purposes of illustration.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. An internal combustion engine, having a combustion chamber and a piston, means for introducing and burning an explosive charge in the combustion chamber during a portion of the cycle of operation, means for introducing cooling water into the combustion chamber during another portion of the cycle of operation and means for varying the period of introduction of water, in relation to the movement of the piston.

2. An internal combustion engine, having a combustion chamber and a piston, means for introducing and burning an explosive charge in the combustion chamber during a portion of the cycle of operation, means for introducing cooling water into the combustion chamber during another portion of the cycle of operation and means for varying the period of introduction of water in relation to the movement of the piston, and means for varying the amount of water introduced into the combustion chamber.

3. An internal combustion engine, having a combustion chamber, and a piston, there being an inlet to the combustion chamber for the admission of water, means for controlling the admission of water, and a cam for operating said means, said cam acting to simultaneously control the amount of water admitted, and control the period of admission of water in relation to the movement of the piston.

This specification signed and witnessed this seventeenth day of September, 1915.

LEONARD H. DYER.

Witnesses:
ANNA E. RENTON,
CHAS. SCHNEIDER.